(12) United States Patent
Kahlhamer

(10) Patent No.: US 6,213,065 B1
(45) Date of Patent: Apr. 10, 2001

(54) TWO-CYCLE ENGINE EXHAUST PORT REGULATOR

(76) Inventor: Bruce Roland Kahlhamer, Hwy. 22, P.O. Box 72, Wild Rose, WI (US) 54984

( * ) Notice: Subject to any disclaimer, the term of this patent is extended or adjusted under 35 U.S.C. 154(b) by 0 days.

(21) Appl. No.: 09/437,960

(22) Filed: Nov. 10, 1999

(51) Int. Cl.[7] ................................................... F02B 75/02
(52) U.S. Cl. ..................................................... 123/65 PE
(58) Field of Search ........................... 123/65 PE, 65 PD, 123/65 V, 65 EM, 65 P

(56) References Cited

U.S. PATENT DOCUMENTS

| | | | |
|---|---|---|---|
| 3,799,498 | 3/1974 | Wickham et al. | 251/129 |
| 4,033,378 | 7/1977 | Pauliukonis | 137/614.19 |
| 4,202,297 | 5/1980 | Oku et al. | 123/65 PE |
| 4,285,357 | 8/1981 | Jones | 137/85 |
| 4,321,893 | 3/1982 | Yamamoto | 123/65 PE |
| 4,364,346 * | 12/1982 | Shiohara | 123/323 |
| 4,776,305 | 10/1988 | Oike | 123/65 PE |
| 4,970,997 | 11/1990 | Inoue et al. | 123/90.16 |
| 5,218,819 | 6/1993 | Cruickshank | 60/314 |
| 5,220,890 | 6/1993 | Koriyama | 123/65 PE |
| 5,337,707 | 8/1994 | Blundell et al. | 123/65 PE |
| 5,588,402 * | 12/1996 | Lawrence | 123/65 PE |
| 5,678,404 | 10/1997 | McManus | 60/313 |
| 5,873,334 * | 2/1999 | Heinrich | 123/65 PE |
| 5,904,122 * | 5/1999 | Hayd | 123/65 V |

* cited by examiner

Primary Examiner—Willis R. Wolfe
Assistant Examiner—Hai Huynh
(74) Attorney, Agent, or Firm—Loyd W. Bonneville Attorney

(57) ABSTRACT

A two-cycle engine combustion cylinder exhaust port power regulator disposed to operate by opposing spring and pneumatic action so as to advance and withdraw a sliding tongue disposed, respectively, to effectually reduce or enlarge the exhaust port so as to enhance engine performance at both low and high RPM.

10 Claims, 5 Drawing Sheets

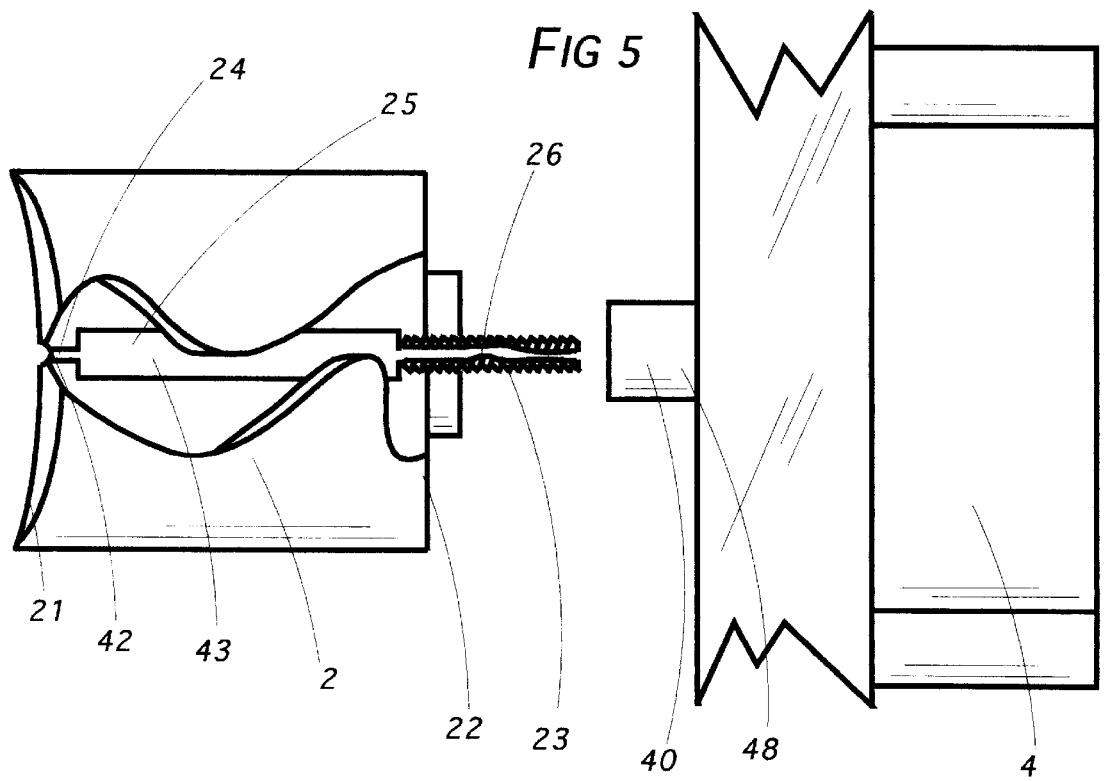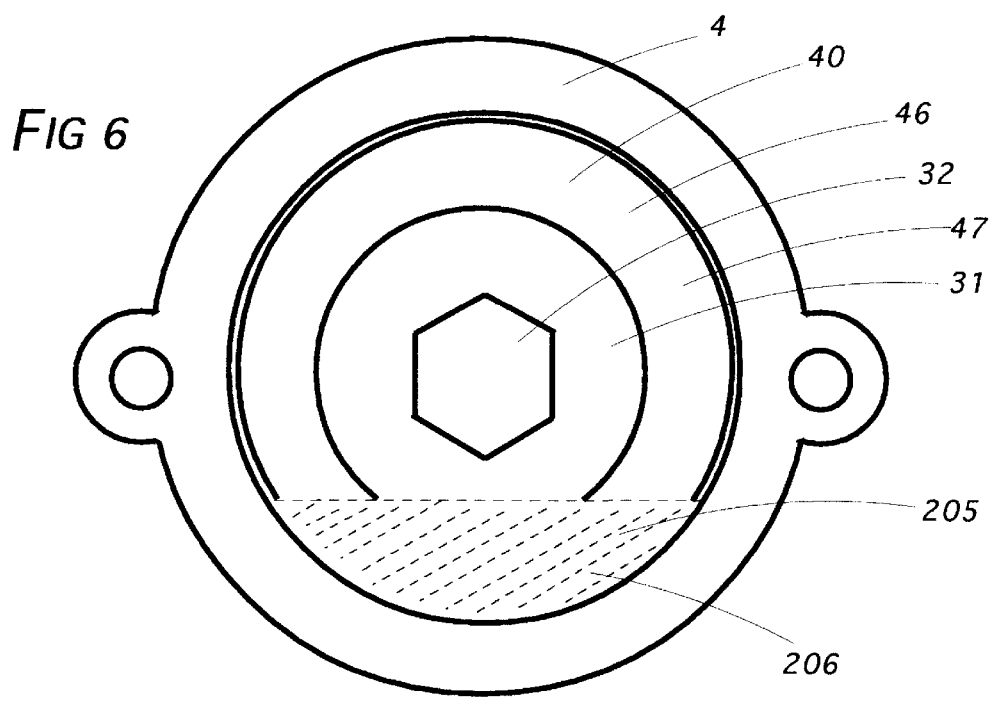

TWO-CYCLE ENGINE EXHAUST PORT REGULATOR

BACKGROUND OF THE INVENTION

1. Field of the Invention

Two-cycle engine accessories

2. Description of the Prior Art

Occasionally a descriptive term in this application may be shortened so as to recite only a part rather than the entirety thereof as a matter of convenience or to avoid needless redundancy. In instances in which that is done, applicant intends that the same meaning be afforded each manner of expression. Thus, the term gas pressurizing control cylinder (4) might be used in one instance but in another, if meaning is otherwise clear from context, expression might be shortened to control cylinder (4) or merely cylinder (4). Any of those forms is intended to convey the same meaning. The term attach or fasten or any of their forms when so used means that the juncture is of a more or less permanent nature, such as might be accomplished by bolts, welds or adhesives. Thus it is stated herein that the pneumatic exhaust control piston (40), where interthreading is employed as the means of connection, is attached to the combustion cylinder (200). A connection in which one object is easily removed from another is described by the word emplace, as where it is stated herein that the sliding tongue (2) is partially emplaced within the exhaust port (203) during a particular phase of operation. Employment of the words connect or join or any of their forms is intended to include the meaning of both in a more general way.

The term rigid emplacement denotes a connection other than by attachment which, nevertheless, permits separation only with considerable difficulty. It is accordingly stated herein that the connection of the spring (3) to the spring seating bolt head (32) at the spring abutment zone (31) is one of rigid emplacement The word comprise may be construed in either of two ways herein. A generic term used to describe a given one of a number of specific elements is said to comprise it, thereby characterizing the specific element with equivalency in meaning for the generic term. Thus, means (300) to emplace the sliding tongue (2) within the exhaust port (203) may be said to comprise the spring (3), meaning that in the particular case, the means (300) is that particular object (3) as opposed to some other, such as an operably manipulated cable or a servo-mechanism of some sort. However, the word comprise may also be used to describe a feature which is part of the structure or composition of a given element. Thus, a shock absorbing gas pressurizing control cylinder (4) may be said to comprise a pneumatic chamber (44), meaning that the structure of the cylinder (4) is such as to have the pneumatic chamber (44) as a feature of its structure. The meaning in the respective cases is clear from context, however. Accordingly, modifying words to clarify which of the two uses is the intended one seem unnecessary.

Terms relating to physical orientation such as , up, down, higher and lower refer to the positioning of an engine part in the manner in which it is typically mounted in a vehicle and consistent with the manner the subjects of this application are shown in the drawings. Thus, the exhaust port (203) is frequently spoken of as being disposed proximate the top of the combustion cylinder (200) and the intake port as being disposed at the bottom thereof (200). Consistent with this is the reference, supra, to "raising" the exhaust port (203) as a design remedy.

The term effectually open and effectually closed, is used herein with reference to the degree of obstruction of the sliding tongue (2). The tongue (2) is stated herein to effectually open and effectually close the exhaust port (203). The use of such terminology acknowledges the fact that even when the tongue (2) is brought to its maximum interference point within the port (203), a substantial opening necessary to allow the flow of sufficient exhaust for engine idling remains. Although the tongue's (2) closure may not, therefore, be complete, it may correctly be said to be effectually so. Conversely, although the tongue (2) may have not been withdrawn completely from the port (203) during high RPM operation, maximum airflow may have, nevertheless, been attained. At that height, the tongue (2) is stated herein to be effectually open.

The two-cycle engine known to prior art has widespread application including several varieties of lawn mowers, snow throwers, snowmobiles, water craft and other sports vehicles. Such an engine enjoys economy in production in that several valves and other moving parts are eliminated therefrom. The body of the piston (201) itself conveniently blocks and unblocks ductwork communicating with the combustion cylinder (200) as it (201) reciprocates in advance and withdrawal within the cylinder (200). It is universally recognized that at high powered operation involving numerous revolutions per minute (RPM), maximum power may be attained—or at least approached—if the end products of combustion, or exhaust, are expeditiously removed from the engine. An engine built to accommodate that result, however, encounters difficulty at low RPM, where the enlargement of the exhaust port (203) diminishes air velocity much in the same manner experienced with the slower ejection rate of water from a substituted garden hose of greater diameter than that otherwise employed. Differences in air velocity are associated with what is commonly regarded as "throttle response" or "quickness" At low RPM, advantage is gained by reserving at least a portion of the exhaust to interfere with the combustion process. Accordingly, compromises have had to be made in manufacture to attain acceptable performance at what might be considered either end of the spectrum.

An engine dedicated to acceptably smooth performance at low RPM, therefore, necessarily loses something at high RPM. Where high RPM performance is a priority, efforts undertaken to recover what is otherwise foregone entail, for example, "raising the ports"—that is, enlarging the top parameter of the exhaust port (203) so that it (203) becomes and remains at least partially unblocked by the combustion piston (201) during a longer portion of the combustion cycle. Thus, in terms of a 360 degree combustion piston (201) stroke, approximately as much as 25 degrees may be added. The matter is also frequently addressed in terms relating to the "timing" of the cycle or "pulse activation" and, not surprisingly, efforts have been undertaken to address the low RPM end of the spectrum by spoiling, as it were, the precise timing of the engine otherwise demonstrated at high RPM.

Novel devices have been introduced over recent decades to interfere mechanically with the otherwise efficient discharge of exhaust at low RPM and to enhance it mechanically at high RPM. The most promising appears to comprise a device attached to the combustion cylinder (200) which regulates power by moving a mechanical obstructor into—or conversely out of—the exhaust path. Because of its configuration and manner of operation, such a device has occasionally been referred to as a "guillotine".

The airflow comprises a cycle in which the fuel, air and oil mixture passes through the combustion cylinder's intake port (207), becomes pressurizing gas (202) as a result of the combustion piston's (201) operation and ultimately emerging as spent gas through the exhaust port (203). When the obstructing device is emplaced for maximum blockage of the exhaust port (203), the increase in air velocity enhances carburetor efficiency.

The transition between maximum blockage at low RPM and an effectually open position at high in many of the prior art devices is too abrupt for the carburetor to keep up with, however. A properly configured system should be capable of producing smoother transition between the two extremes to maximize carburetor performance.

Early developments produced a manually controlled cable which operably manipulated the obstructing device for the effect desired. It was eventually discovered that electro-servo mechanisms—or alternatively, even a simple spring—could be installed to impel the obstructing device partially into the exhaust port (203). The converse action, partial or total withdrawal of the device therefrom (203) could be accomplished by utilizing the compression force of the precombustion gas to effectually blow the obstructor out of the way. In some cases, accordion-like "boots" or bellows were employed; in others, merely a pivotable flap. Some inventors focussed upon rotating obstructors positioned to move where required during the power cycle. Some devices actually relied upon displacement of an obstructing mechanism by trip action effected by the combustion piston's contact with it—that is, by effectually knocking it into or out of blocking position. Some of the devices responded in lock-step with the rhythm of combustion, such that with each cycle, they underwent a corresponding reciprocating movement.

It must be recognized, of course, that the combustible mixture present within the system comprises a suitable mixture of gasoline and oil dispersed throughout ambient air and that the exhaust produced therefrom comprises spent combustion end products. In operation, some residual exhaust undoubtedly mixes with the combustible mixture present. The mix of gas undergoing compression as the combustion piston (201) advances is referred to herein as pressurizing gas (202).

It should be recognized that the preferred automatically variable compression devices designed for exhaust port power control do not function at a rate associated with engine revolutions. Thus, at high RPM, the mechanical parts of the device do not themselves reciprocate in rhythm as in the case of some devices referred to supra. Rather, it is because the combustible compression produced at high RPM is substantially greater than that produced at low RPM that such preferred devices are impelled to one position or another. The compression associated with high RPM, thus, preferably causes such an obstructor to move to a position which allows essentially unrestricted exhaust emission. At low RPM, compression drops and some device—a spring in some cases, a servo mechanism in others—should cause the obstructor to move to a position which restricts the mass of exhaust, thereby increasing its velocity so as to enhance low speed operation. During a sustained episode of high RPM, the obstructor remains in a generally fixed position by which the exhaust port (203) is widely opened. At sustained low RPM, the obstructor again remains in a generally fixed position, but partially restricting the exhaust port (203). At intermediate RPM, a corresponding intermediate result is achieved.

Some of the prior art devices relied heavily upon hydraulic control mechanisms. Often, many of them have been prone to popping open and slamming shut, lacking the smoothness desired in operation.

U.S Pat. No. 5,904,122 issued to Hoyd entailed an attractive and in other respects efficient exhaust emission control valve relying upon an operator's manual adjustment to effect a desired setting for the device. So far as operably manipulated devices are concerned, that one demonstrated considerable improvement over those involving throttle knobs and cords or like devices which diverted the operator's attention from controlling the vehicle's movement in a more general way. An even greater improvement, of course, would be an assembly which obviates even such pre-operation setting manipulation.

Some of the historical efforts at exhaust control involved drastic engine reconfiguration, offering even the remarkable remedy of shifting engine lobes or chambers—referred to as "epochoidal" surfaces—so as to increase or decrease combustion cylinder (200) volume. For the degree of complexity involved, U.S. Pat. No. 4,202,297 issued to Oku, et al, appeared reasonably early, comprising special configuration within or immediately about the combustion chamber (200). The Oku, et al device is a two-piece one requiring considerable attention in assembly.

U.S. Pat. No. 3,799,498 issued to Wickham; U.S. Pat. No. 5,337,707 issued to Blundell, et at, and U.S. Pat. No. 5,678,404 issued to McManus all feature servo-mechanisms to control partial exhaust port (203) blockage. The Wickham device employs an elastic diaphragm reactive not to pressures which are pneumatic but rather, hydraulic.

U.S. Pat. No. 4,321,893 issued to Yamamoto refers to prior art incorporating exhaust port (203) control through an operative throttle and itself comprises a mechanical governor apparatus dedicated to that end.

U.S. Pat. No. 4,033,378 issued to Pauliukonis; U.S. Pat. No. 4,776,305 issued to Oike; and U.S. Pat. No. 4,970,997 issued to Inoue, et. al all employ one form or another of mechanical spring action for either direct or indirect exhaust port (203) control, the Oike spring applying resilient bias not upon an exhaust port (203) obstructor but against a cam with which it cooperates. The Pauliukonis device also depends upon cam action. The Inoue, et al patent features some degree of control over the resiliency of the spring itself.

Devices which are at least partially controlled pneumatically are shown in U.S. Pat. No. 4,285,357 issued to Jones and U.S. Pat. No. 5,218,819 issued to Cruickshank. The first of the two illustrates a device comprising an elastic diaphragm as the exhaust port (203) obstructor itself. The second, one also employing a diaphragm comprising "baffle" construction operating in cooperation with a rotating shaft mechanism for exhaust control.

Other pneumatically controlled devices of interest include U.S. Pat. No. 4,364,346 issued to Shiohara, U.S. Pat. No. 5,588,402 issued to Lawrence and U.S. Pat. No. 5,873,344 issued to Heinrich. All three include an exhaust port obstructing plate which is caused to protrude angularly into and retract from the port to a varying extent, thereby reducing or increasing, respectively, the volume of exhaust emitted from the system. The Shiohara patent, unfortunately, fails to describe the control mechanism which moves the plate, asserting the assumption that prior art has already provided what is necessary.

Both of the other patents rely upon an elastic diaphragm responsive to combustion fuel-air pressure. The Lawrence device, claiming optionally to feature an electronic sensor, employs as the source of pressure used to energize the diaphragm that within the engine's intake section. The Heinrich valve uses pressure within the combustion chamber itself.

Although pneumatic control systems deriving their energizing force from the exhaust port itself are known in the art, the immediately foregoing inventors of such devices hoped to avoid what they considered objectional shortcomings by enslaving gas pressure from the alternative sites chosen by them. One of the objections, for example, has been the proposition that exhaust gas contains unwanted oil droplets or other contaminating combustion byproducts. A sufficiently innovative design, however, might well meet that challenge.

In a sense, it may well be that the intended shift from an exhaust port gas source to some other in the engine may be recognized in the old adage of throwing the baby out with the bath water. The mechanisms devised to accomplish the task entail difficulties which may fairly be said to at least equal those of their predecessors. By their nature, diaphragms comprise a flexible composition prone to wear with continued use and, quite often, chemical decomposition with age. Complex ducting is required to transport the pressurized gas to its intended diaphragm site. Unfortunately, the ductwork is made to comprise a comparatively long tunnel disposed within the engine block. Judging by the prior art, it is apparently impractical to route the pressurized gas through external tubing. Then, a second tunnel is also generally included in order to provide dampening desired—if not required absolutely—for smooth operation.

What is needed is a pneumatically energized valve relying upon exhaust port gas as its source but which does not require the manufacturing expense of drilling or casting a conduit into the engine block; and a dampening mechanism which does not rely upon a second such conduit but instead employs waste exhaust oil droplets in accomplishing its function.

A review of the foregoing sequence of development demonstrates clearly the vigor with which the exhaust control problem has been addressed. Nevertheless, the needs or objectives pointed out supra thus far remain only partly addressed in the prior art. Some, such as that just immediately discussed, have not been met at all.

SUMMARY OF THE INVENTION

The invention, referred to herein as a two-cycle engine exhaust port power regulator comprises what might be considered on the one hand, an improvement to a two-cycle engine and on the other, a particular assembly in an of itself which, when attached to and permitted to function upon a two-cycle engine enhances its performance throughout the spectrum of applied power ranging from high RPM to low RPM.

The exhaust port power regulator comprises an exhaust port power control assembly (1) comprising in turn a sliding tongue (2), a pneumatic exhaust control piston (40) disposed within a shock absorbing gas pressurizing control cylinder (4) and a spring (3) disposed therein (4). The sliding tongue (2) is seated so as to advance and withdraw in sliding fashion within a tongue access channel (5). By reason of the tongue's (2) advance, it (2) becomes emplaced to a greater or lesser degree within the exhaust port (203) of a combustion cylinder (200). Partial or total withdrawal of the tongue (2) within the channel (5) effectually opens—or clears the port (203). The degree to which the port (203) is either obstructed by the tongue's (2) intrusion or cleared by its (2) withdrawal directly effects the degree to which the engine's available power is utilized. For maximum efficiency throughout the range of available engine power, substantial utilization thereof is desired at high RPM and less at low RPM. The tongue (2) comprises a pneumatic tunnel (43) communicating with the interior of the exhaust port (203) and indirectly, therefore, with the combustion cylinder (200). The tongue (2) may also comprise a pneumatic well (42) disposed along its advancing end (21). Where present, a pneumatic well (42) markedly enhances pneumatic pressure and engine efficiency.

The end of the tunnel (43) proximate the sliding tongue's advancing end (21) is preferably disposed within the pneumatic well (42) and both (42, 43) are preferably disposed centrally along that end (21) of the tongue (2).

The invention further comprises a tongue access shoulder (6) and a tongue access channel (5) disposed to pass through the shoulder (6) and into the exhaust port (203).

Pressurizing gas (202) resulting from combustion piston (201) advance at high RPM within the combustion cylinder (200) is employed in forcing the tongue's (2) withdrawal. The pressurizing gas (202) is forced through the pneumatic tunnel (43) into a pneumatic chamber (44) providing means to advance the control piston (40) within the cylinder (4).

A spring (3) is disposed within the assembly to counter the force of the gas (202) such that during low RPM operation, when the pressurizing effect is diminished, the tongue is advanced into the exhaust port (203).

These modes of operation do not comprise discontinuous events but rather the extremes of a tongue (2) emplacement gradient. Thus, the degree of the tongue's (2) intrusion into the exhaust port (203) lies along a gradient indirectly related to sustained RPM number.

The specific means employed in causing the tongue's (2) withdrawal from the port (203) comprises a pneumatic exhaust control piston (40) seated within the gas pressurizing control cylinder (4), supra, and attached to the tongue (2) at a point distal the port (203) such that as the tongue (2) withdraws along the channel it (2) is seated within (5), it (2) pushes the control piston (40), advancing it (40) within the control cylinder (4), overcoming the resiliency of a spring (3) seated so as to act in opposition to the force of the gas causing the tongue (2) to withdraw. As gas pressurization diminishes upon reduction of RPM, the resiliency of the spring (3) overcomes the opposing force of the gas pressure (202), the control piston (40) is caused to withdrawal within the control cylinder and the sliding tongue (2) is caused to intrude at least partially into the exhaust port (203).

The sector of the control cylinder (4) disposed opposite the pneumatic chamber (44) may comprise a dampening chamber (47) within which hydraulic fluid—the oil precipitate (205) from the pressurizing gas (202)—collects. Dampening—that is, provision for shock absorption—enhances smoother engine operation than otherwise attainable. Oil (205) is widely accepted as a good shock absorbing substance.

The control cylinder (4) and sliding tongue access channel (5) are disposed at a canted angle (ø), such that the precipitate (205) resides in an oil reservoir (206) which occupies approximately one-third the volume of the cylinder (4) upon withdrawal of the control piston (40). It is also within the dampening chamber (47) of the control piston (40) that the spring (3) is seated upon a spring seating bolt head (32). The seating site is designated a spring abutment zone (37) herein.

BRIEF DESCRIPTION OF THE DRAWINGS

Solid lines in the drawings represent the invention. Dashed lines represent either noninventive material; that not incorporated into an inventive combination hereof; or that which although so incorporated, lies beyond the focus of attention.

FIG. 5 illustrates a cut-away side view of the sliding tongue (2) and the means of its (2) attachment—a threaded pin (23)—to the gas pressurizing control cylinder (4). The pneumatic well (42) and tunnel (43) are also shown. The tunnel sectors—frontal (24), middle (25)—and the threaded pin tunnel (26) are separately identified.

FIG. 6 comprises a cross section view of the control cylinder (4), pointing out the site of the spring abutment zone (31) on the control piston's second face (46) and indicating the disposition of the hydraulic reservoir (206) within the cylinder's dampening chamber (47). Precise peripheral clearance is shown between the piston (40) and the cylinder (4), through which the oil precipitate (205) collected from the pressurizing gas (202) passes.

DESCRIPTION OF THE PREFERRED EMBODIMENT

Figure 1:
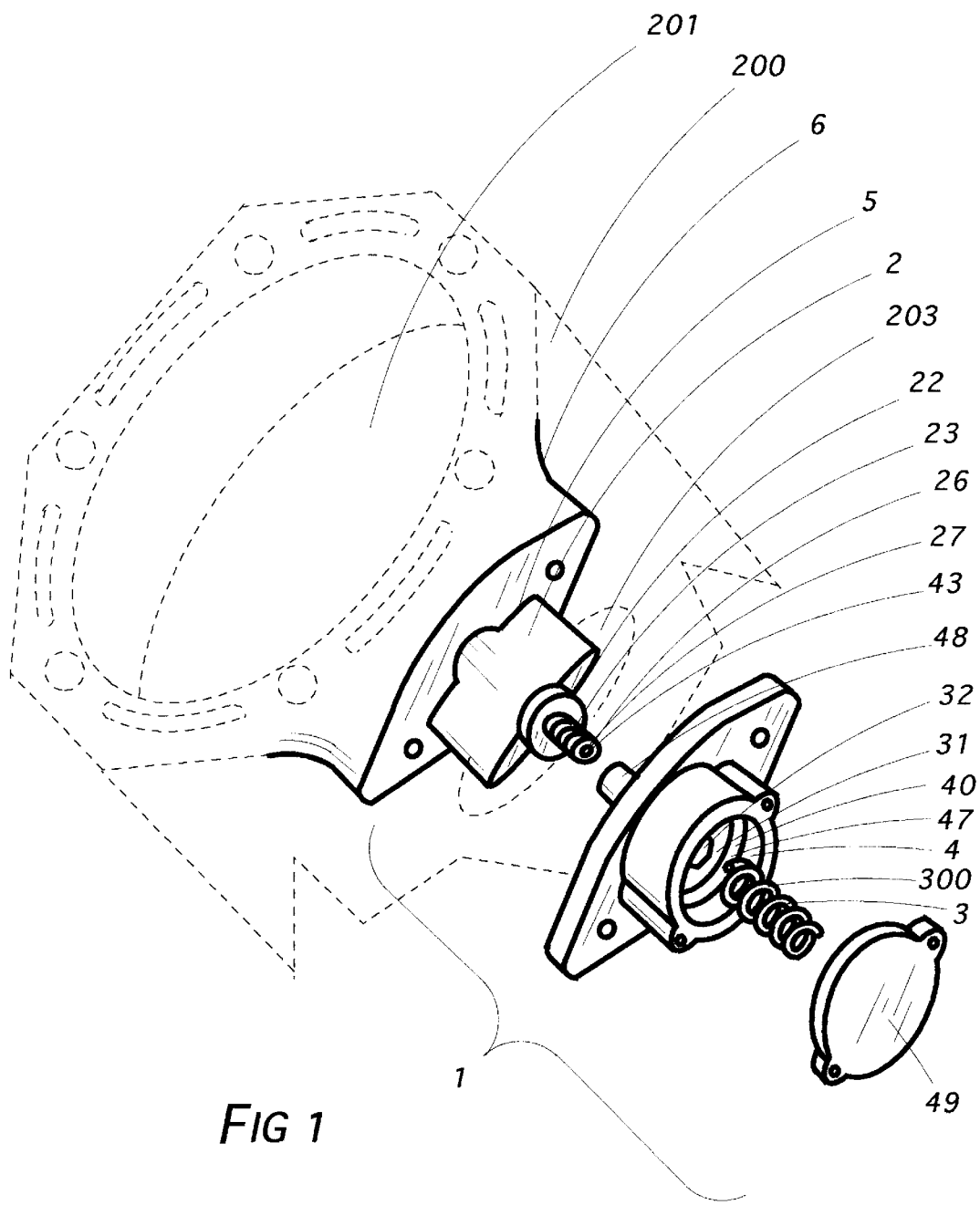
FIG. 1 depicts a perspective exploded view of an embodiment of the invention in which the attachment of the tongue access shoulder (6) is accomplished by way of molding, such that the shoulder and combustion cylinder (200) comprise one-piece configuration. The sliding tongue (2) is shown only partly emplaced within the shoulder (6).

The subject of this application comprises an object which upon appropriate attachment to a slightly modified exhaust port of a two-cycle engine combustion cylinder (200), permits performance at optimum efficiency along the entire range of power levels. Thus, it is unnecessary to compromise high power operation merely to enhance that at the low power end.

In the main, the invention features an exhaust port power control assembly (1), comprising in turn a sliding tongue (2), a spring (3) and a pneumatic exhaust control piston (40) disposed within a shock absorbing gas pressurizing control cylinder (4). The invention further comprises a tongue access shoulder (6) and a tongue access channel (5) disposed to provide a pathway for the tongue (2) through the shoulder (6) and into the interior of the exhaust port (203).

The tongue (2) is configured and disposed in a manner by which it occupies a range of positions within the access channel (5). Depending upon the particular position occupied, the tongue (2) impedes all or a portion of the exhaust emission ranging from what is determined to be maximum to no blockage at all. This is accomplished in part by one of a number of means generally known to prior art but in other respects, by other novelties disclosed herein.

As an improvement to an existing combustion cylinder (200), the invention requires modification thereof (200) in at least one respect. An exhaust port canted slot (55) must be cut through the exhaust port wall (203), preferably along a direction transverse or partially so—that is, at an angle—to the port's (203) longitudinal extension. Experience has demonstrated preference for an angled disposition, partly because of the improved gradient made possible by the geometric interrelationship of parts. It is generally recognized that fully transverse blockage of a conduit tends to provide a more abrupt response than that attainable by that which is only partial. There is an additional reason for disposition at a canting angle ($\phi$) relating to provision of an efficient hydraulic reservoir (206), discussed ante.

A second combustion cylinder (200) modification may also be undertaken. It is preferable that the tongue access channel (5) be housed within a particular type of tongue access shoulder (6)—to wit an attaching access shoulder (60), mounted proximate the juncture of the exhaust port (203) and the cylinder (200). The connection between shoulder (60), when included, and port (203) must be one of attachment—preferably a molded one in which the cylinder (200) and port (203) themselves are formed to incorporate the shoulder (60) integrally. The tongue access channel (5) is, of course, required to line up with the canted slot (55).

Figure 4:
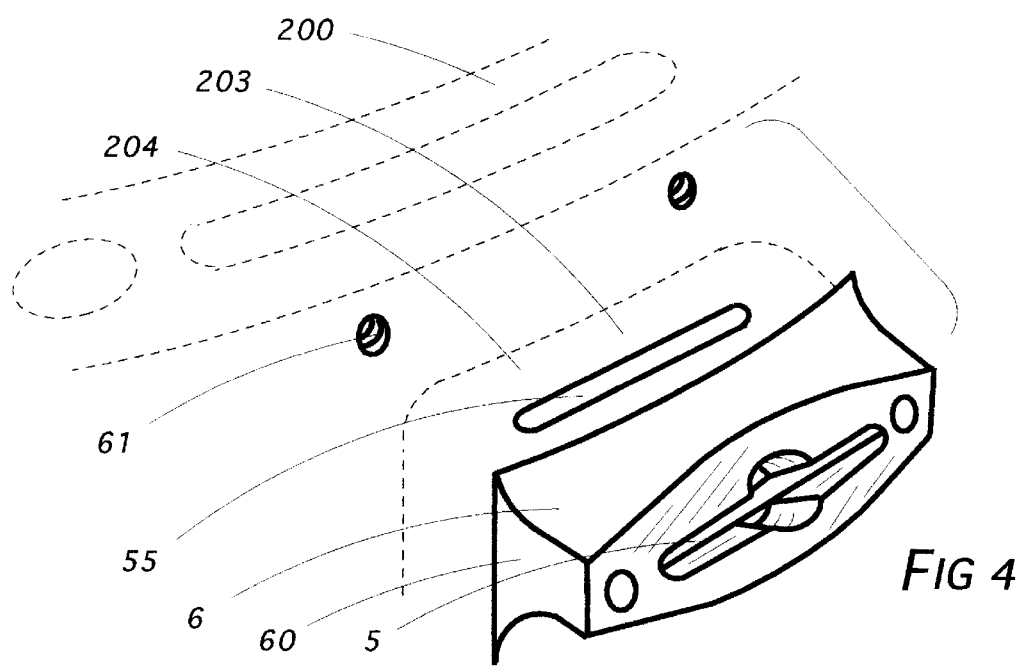
FIG. 4, an exploded perspective rendering depicts an embodiment of the invention in which the tongue access shoulder (6) comprises separate attachable configuration and in which the cutting of a canted slot (55) through the exhaust port wall (204) is necessary. The concept of the invention's customized attachment to existing combustion cylinders (200) is thereby indicated as a feasible proposition.
Figure 7:
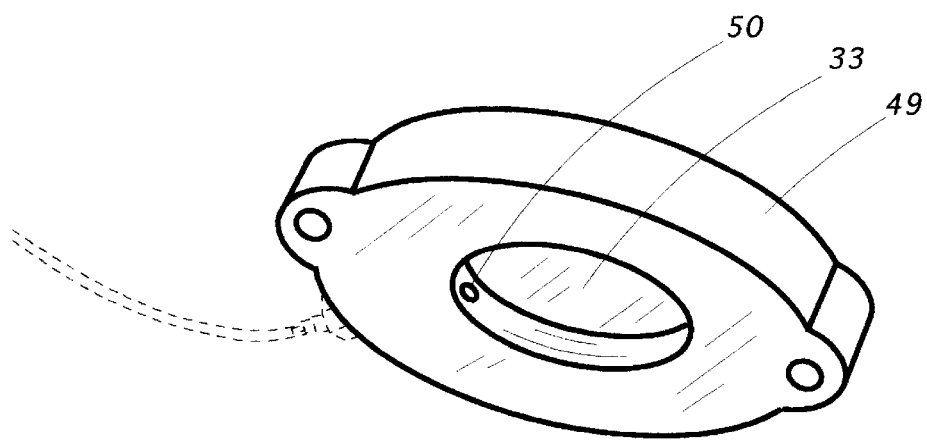
In FIG. 7, a perspective view of the control cylinder end plate (49) is illustrated, showing the recessed spring seat (33) therein as well as tubing to vent oil precipitate (205) exiting the hydraulic relief tunnel (50) and destined for the carburetor, some other two-cycle fuel mixing locus or an oil reservoir.
Figures 8, 9, 10:
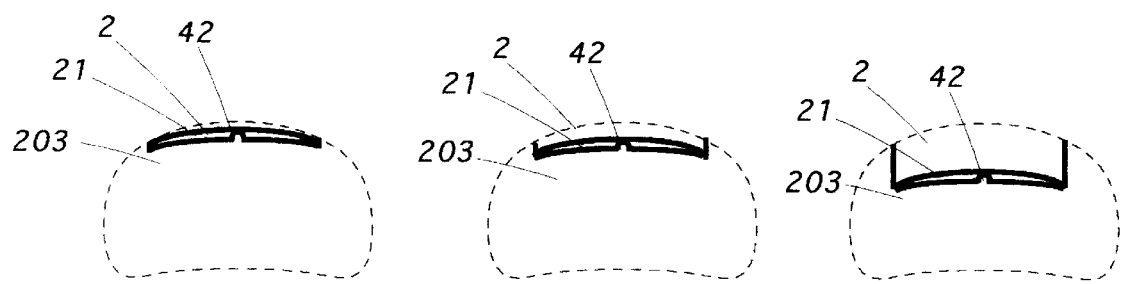
FIGS. 8–10 comprise symbolic representations of three phases of sliding tongue (2) intrusion into the exhaust port (203) ranging from essentially total withdrawal, associated with high engine RPM, to full advance, that involving low RPM. The intermediate position shown in FIG. 9 is merely exemplary, since any degree of tongue (2) advance produces a corresponding emission result.

The separately manufactured shoulder (60) may for the sake of economy, however, be attached to the combustion cylinder (200) and exhaust port (203) by other known means—such as those welded or employing threaded engine bolts. In the latter instance, threaded bolt sockets (67) must be drilled into the combustion cylinder (200). Because of the variances in configuration and dimensions between one manufacturer's engine and another, embodiments featuring this solution require customized preparation. Obviously, the fit must be snug in each case, preferably employing a gasket between the faces of the respective parts. FIG. 4 depicts an attaching access shoulder (60). Although the substitution of the invention herein for another such device entails attachment of a separately configured shoulder (60) of this sort, an exhaust port canted slot (55) may already exist, obviating the necessity of cutting a new one (55).

As indicated in FIG. 1 then, a relatively flat tongue (2) is permitted to slide along a channel (5) shaped to accommodate it reasonably snugly. The degree of tolerance between the sliding tongue (2) and the edges of the channel (5) it (2) moves along should be that consistent with the traditional manufacture of engine parts designed to engage one another without unacceptable friction on the one hand or excessive vibration on the other. The space milled must be sufficient to provide lubricity between the engaging surfaces and this, in general, is true of all of the invention's moving parts.

As mentioned supra, the tongue (2) is but a part, albeit a particularly important one—of the power control assembly (1). It (2) comprises an advancing end (21)—that oriented more proximate the exhaust port (203) seated as it (2) is within the access channel (5)—and a withdrawing one (22)—that then oriented more distal the port (203). By reason of the invention's configuration, the tongue (2) is permitted to advance a maximum fixed distance across the cross sectional ducted opening of the exhaust port (203) and become emplaced therein during a given phase of engine operation.

Although considerable exhaust is still permitted to flow through the duct (203), experience in prior art has established that a limited degree of blockage accomplishes a recognizable change in engine performance. As the tongue (2) is withdrawn along the channel (5) it (2) is housed within, the barrier to exhaust flow is diminished. Preferably, the tongue (2) should be permitted to withdraw to a point where no portion of it (2) remains within the port (203) to impede the flow.

Withdrawal of the tongue (2) within the access channel (5) is accomplished by means of pneumatic pressure. A pneumatic exhaust control piston (4), supra, is attached to the sliding tongue's withdrawing end (22). Although attachment may be made by any known means, a threaded attachment pin (23) disposed to engage a threaded piston shaft (48) within the control cylinder (4), as shown in FIGS. 1 and 5, is preferred for that purpose.

The control piston (4) is disposed to advance and withdraw within the shock absorbing gas pressurizing control cylinder (4), supra—a part of the exhaust port power control assembly (7) disposed by attachment to the combustion cylinder (200).

As the combustion piston (201) advances within the combustion cylinder (200), it (207) displaces a portion of the pressurizing gas (202) present, forcing it (202) into the gas pressurizing control cylinder (4), disposed at a point beyond the sliding tongue (2). The tongue (2) is particularly configured to permit that event. It (2) comprises a portion of a pneumatic tunnel (43) through which the pressurizing gas (202) is ducted, one end of which (43) is disposed at the site of the sliding tongue's advancing end (21) and the other of which (43) is disposed upon the surface of the threaded piston shaft (48) within the pneumatic chamber (44) proximate the tongue's withdrawing end (22), ante. Preferably, in general terms, the tunnel (43) is centrally disposed within the tongue (2)—that is, generally disposed to define the tongue's (2) longitudinal axis, one end of which axis comprises the center of the advancing end (21), the other, emerging from the center of the withdrawing end (22), then continuing through the longitudinal axis of the threaded attachment pin (23) and finally through the longitudinal axis of a threaded piston shaft (48) within the pneumatic chamber (44), exiting therefrom (48) as described ante. Experience demonstrates that central disposition allows employment of a softer spring (3) and smaller control cylinder (4) than would otherwise be necessary.

The tongue (2) may also comprise a pneumatic well (42) disposed along its advancing end (21). Where present, a pneumatic well (42) markedly enhances pneumatic pressure and engine efficiency. The end of the tunnel (43) proximate the sliding tongue's advancing end (21) is preferably disposed within the pneumatic well (42) and both (42, 43) are preferably disposed centrally along that end (21) of the tongue (2). It may, then, be observed that one end of the pneumatic tunnel (43)—that proximate the sliding tongue's advancing end (21)—communicates with the pneumatic well (42) and, therefore, with the exhaust port (203) within which it (42) is disposed and that the other end—that distal the tongue's withdrawing end (22)—communicates with the pneumatic chamber (44).

Figure 3:
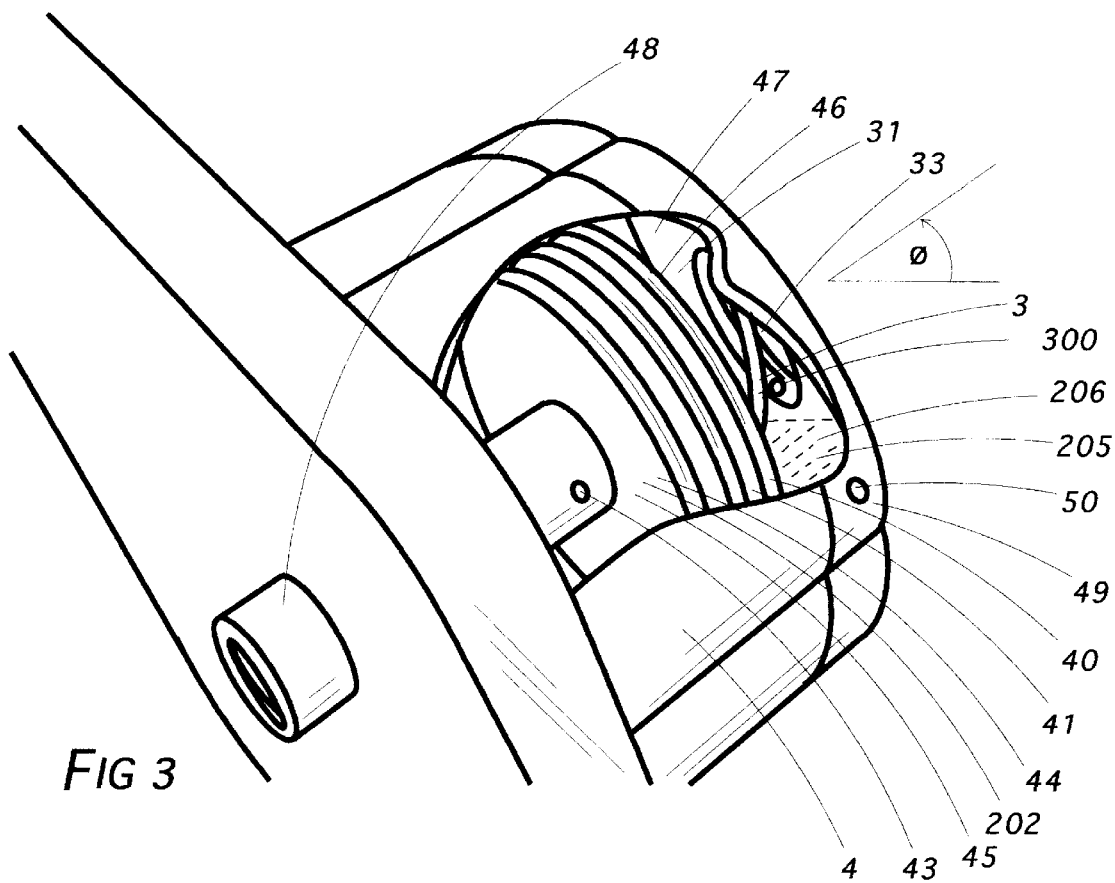
FIG. 3 comprises a cut-away view of the shock absorbing gas pressurizing control cylinder (4), illustrating the exhaust control piston's (40) separation of the pneumatic chamber (44) from the dampening chamber (47). The angle $\phi$ is also shown, indicating the degree of preferable canting required to provide a hydraulic reservoir (206) of oil precipitate (205) which has collected and washed past the peripheral piston grooves (41). A coiled end of the spring (3) is also visible within the recessed spring seat (33) in the cylinder end plate (49).

To be specific with reference to the tunnel's (43) configuration, however, the end of it (43) proximate the tongue's withdrawing end is laterally disposed with reference to the its (43) generally longitudinal direction. The tunnel (43), therefore, is required to take an abrupt turn proximate the more interior end as shown in FIG. 3. Were such configuration absent and the tunnel (43) permitted to continue onward longitudinally, it (43) would emerge instead on the control piston's second face (46) inside the dampening chamber (47) and outside of the pneumatic chamber (44) portion of the gas pressurizing control cylinder (4) as required to accomplish its (43) task.

The pneumatic tunnel (43) is preferably configured to comprise differing or varying diameter throughout its (43) length.

Thus, as indicated in FIG. 5, a frontal tunnel sector (24), or portion thereof (43) proximate the tongue's advancing end (21), is of relatively limited diameter—preferably 0.050 inch. A threaded pin tunnel (26), or portion of the tunnel (43) axially disposed along the length of the threaded pin (23), preferably comprises diameter of 0.080 inch. The middle tunnel sector (25), or portion lying between, as shown in FIG. 5, preferably comprises diameter of 0.200 inch. These preferred dimensions were arrived at after considerable experimentation and development. Experience has demonstrated that where the pneumatic tunnel (43) is manufactured in this configuration, utilizable power is considerably enhanced.

To facilitate assembly in manufacture, the end of the threaded pin (23) most distal the sliding tongue (2) preferably comprises an installation recess (27), a hexagonally shaped well of diameter larger than the end of the tunnel (43) emerging there and otherwise of size to accommodate an appropriate assembly tool—an Allen® wrench, for example.

For the sake of convenience in discussion, the pneumatic exhaust control piston (40) is considered to comprise first and second faces (45,46, respectively). The piston's first face (45) comprises that defining a moving wall of the pneumatic chamber (44). The second face (46) opposes the first (45) and defines a moving wall of a spring abutment zone (31) within the dampening chamber (47). The control piston (40) is disposed to advance and withdraw within the control cylinder (4). The pneumatic chamber (44) is situated within the control cylinder (4) proximate the sliding tongue (2) and the spring abutment zone is situated therein (4) distal the tongue (2). The spring (3) is well secured within the control cylinder (4). Its (3) connection therein with the spring seating bolt head (32) at one end and the recessed spring seat (33) at the other, therefore, comprises one of rigid attachment.

The control piston (40) also comprises a threaded shaft (48) axially disposed upon its first face (45). A portion of the pneumatic tunnel (43) described supra is longitudinally disposed within the shaft (48). It is within this shaft (48), illustrated in FIG. 3, that the tunnel (43) takes its (43) abrupt turn, supra.

As the control piston (40) advances, the pneumatic chamber (44) is enlarged and the dampening chamber (47), diminished in volume. The opposite occurs, of course, upon withdrawal of the control piston (40). To avoid confusion, it must be recognized that as the sliding tongue (2) is advanced into the exhaust port (203), the control piston (40) attached to it (2) is withdrawn, enlarging the dampening chamber (47). Conversely, as the tongue (2) is withdrawn from the port (203), the control piston (40) is advanced within the control cylinder (4).

The forcing of the pressurizing gas (202) through the pneumatic tunnel (43) and into the control cylinder (4) impels the control piston (40), advancing it (40) within the cylinder (4). Thus, as compression increases within the combustion cylinder (200), pressurizing gas (202) advances the control piston (40), which in turn withdraws the sliding tongue (2) to which it (40) is attached from the exhaust port (203).

The converse effect, however, the control piston's (40) withdrawal within the control cylinder (4) and consequent advance of the tongue (2) partially into the exhaust port (203) is accomplished by other means. A spring (3) is disposed within the exhaust port power control assembly (1) so as to bear upon the control piston's second face (46)—that defining part of the spring abutment zone (31). The sliding tongue (2), the control piston (40) and the spring (3), directly linked in disposition as they are, result in the spring's emplacement of the tongue (2)—to a greater or lesser degree—within the exhaust port (203).

The shock absorbing gas pressurizing control cylinder (4) is capped by a control cylinder end plate (49), depicted in FIGS. 1–3 and 7. The end plate (49) comprises a hydraulic relief tunnel (50), discussed ante and preferably, a recessed spring seat (33) disposed such that the spring (3) may be securely seated therein (33). The diameter of the seat (33) should, thus, approximate that of the spring (3).

Figure 2:
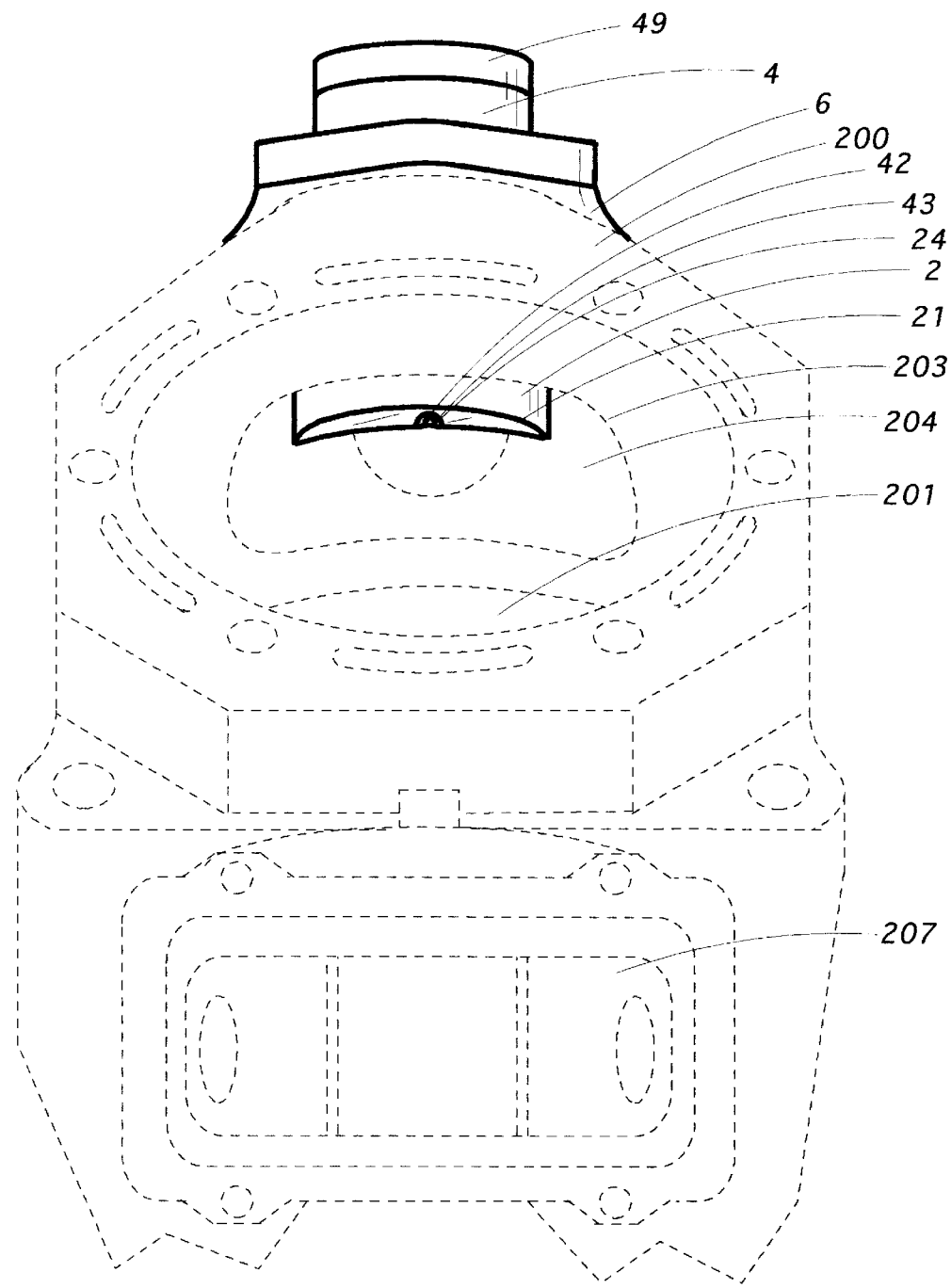
FIG. 2 represents a view of the combustion cylinder (200) from the opposite side illustrated in FIG. 7. Here, the tongue's (2) intrusion into the exhaust port (203) is at or near its intended maximum and both the pneumatic well (42) and the end of the pneumatic tunnel proximate the tongue's advancing end (21) are evident.

As compression is diminished within the combustion cylinder (200), the control piston (40) is caused to withdraw within the control cylinder (4) by reason of the spring's (3) expansion in the absence of sufficient opposing force from the pressurizing gas (202). Consequently, the attached sliding tongue (2) is advanced partly into the exhaust port (203) to as to impede exhaust emission and to enhance otherwise lost low speed power. All of this is illustrated in FIGS. 1–3.

The invention hereof, thus, permits simple control of the sliding tongue (2) by means of automatic adjustment between fundamental opposing forces—that on the one hand from the pressurizing gas (202) and on the other, from the spring (3).

Experience teaches the operation of the pneumatic exhaust control piston (40) is improved if provision is made to dampen its (40) advancing and withdrawing movements. A dampening chamber (47) is, therefore, preferably provided for. For such purpose, the control piston (40) is disposed within the shock absorbing gas pressurizing control cylinder (4) to divide it (4) into two parts—the pneumatic chamber (44) on the one hand and the dampening chamber (47) on the other. As explained supra, the pneumatic chamber (44) is the sector of the pressurizing cylinder (4) proximate the sliding tongue (2). The dampening chamber (47) is the sector thereof (4) distal the tongue (2). The spring abutment zone (31) disposed at the control piston's second face (46) addressed supra is thus, disposed within part of the dampening chamber (47).

As is well known with reference to two-cycle engines and addressed supra, oil is dispersed throughout the pressurizing gas (202). Over a period of control cylinder (4) operation, portions of the oil (205) precipitate within it (4) out of the gas mixture (202). To accommodate this precipitate (205) and in keeping with known piston and cylinder technology, the control cylinder (4) is configured to provide hydraulic fluid perimeter clearance between the piston (40) and the wall of the cylinder (4) within which it (40) advances and withdraws. The oil precipitate (205) is thereby permitted to gravitate along the piston (40) edges from the pneumatic chamber (44) to the dampening chamber (47), where it (205) collects.

The exhaust port power control assembly (1) is preferably canted at an angle in its (7) attachment to the combustion cylinder (200) as shown in FIGS. 1, 3. Such disposition permits the oil precipitate (205) to form a hydraulic fluid reservoir (206) removed from the zone of activity within the control cylinder (4). Experience demonstrates that for optimum dampening efficiency and to avoid what has been recognized as "hydraulic lock", the hydraulic fluid reservoir (206) should occupy approximately one third the volume of the dampening chamber (47). The angle of canting ($\phi$) should be just sufficient to provide such fractional disposition.

The oil precipitate (205) is constantly replenished in operation. The hydraulic relief tunnel (50) vents off a portion of it, routing it back to the carburetor, other fuel mixing site or an oil reservoir. By reason of widely recognized positive and negative vacuum pressure principles, the carburetor—if present—effectually draws or pulls the pneumatic exhaust control piston (40) in its (40) advance. This cycling of the oil (205) quickens system response and provides self cleaning.

What is claimed is:

1. A two-cycle engine exhaust port power regulator comprising an exhaust port power control assembly;

a tongue shoulder attached proximate the top of an engine's combustion cylinder; and a tongue access channel disposed within the shoulder and exhaust port wall;

the power control assembly further comprising a sliding tongue disposed within the access channel and comprising an advancing end and an opposed withdrawing end;

a spring biased to advance the tongue within the access channel; and a pneumatic exhaust control piston attached to the withdrawing end of the tongue, disposed to advance and withdraw within a shock absorbing gas pressurizing control cylinder such that as the tongue is withdrawn within the access channel, the control piston is advanced within the control cylinder and that as the tongue is advanced within the access channel, the control piston is withdrawn within the control cylinder;

the control piston disposing the control cylinder into a pneumatic chamber defined by a first face of the control piston disposed upon the withdrawing end thereof, so as to counter the advance tongue biasing of the spring; and a dampening chamber defined by a second face of the control piston disposed upon the advancing end thereof;

the dampening chamber comprising a spring abutment zone wherein the spring is disposed to counter the force of the pressurizing gas causing the control piston to withdraw within the control cylinder;

the sliding tongue further comprising a pneumatic tunnel communicating with the portion of the exhaust port proximate the tongue's advancing end and with the pneumatic chamber;

whereby, upon high powered engine operation wherein relatively high RPM compression forces are present, the tongue is pneumatically caused to withdraw within the access channel, disposing a larger volume of the exhaust port to increase engine exhaust emission, thereby increasing power; and upon low powered operation wherein relatively low RPM compression forces are present, the tongue is caused to advance within the access channel, disposing a smaller volume of the exhaust port to retard engine exhaust emission; thereby enhancing engine performance efficiency throughout the range of operation.

2. The two-cycle engine exhaust port power regulator according to claim 1 wherein the means of attaching the tongue access shoulder to a combustion cylinder comprises molding;

whereby an integral structure is produced.

3. The two-cycle engine exhaust port power regulator according to claim 1 wherein the sliding tongue further comprises a pneumatic well disposed along the advancing end thereof and the end of the pneumatic tunnel proximate the advancing end of the tongue is disposed within the well.

4. The two-cycle engine exhaust port power regulator according to claim 3 wherein the pneumatic tunnel is centrally disposed within the sliding tongue and the end of the pneumatic tunnel proximate the advancing end of the tongue is centrally disposed within the pneumatic well.

5. The two-cycle engine exhaust port power regulator according to claim 3 wherein the dampening chamber of the shock absorbing gas pressurizing control cylinder further comprises a hydraulic reservoir;

the dampening chamber comprising a hydraulic relief tunnel wherethrough oil precipitate may be vented to a carburetor, other fuel mixing site or oil reservoir; and the control cylinder further comprises hydraulic fluid perimeter clearance wherethrough oil precipitate from the exhaust is permitted to pass and collect within the reservoir;

whereby the forces associated with the pneumatic chamber are dampened for smoother emission.

6. The two-cycle engine exhaust port power regulator according to claim 5 wherein the shock absorbing gas pressurizing control cylinder further comprises a control cylinder end plate in which the hydraulic relief tunnel is disposed for venting oil precipitate to the carburetor, other fuel mixing site or oil reservoir;

whereby hydraulic locking effects are reduced.

7. The two-cycle engine exhaust port power regulator according to claim 5 wherein the hydraulic fluid reservoir is disposed by canting so as to maintain the reservoir approximately one-third filled by the hydraulic fluid; whereby hydraulic locking effects are further reduced.

8. The two-cycle engine exhaust port power regulator according to claim 1 wherein the means of the sliding tongue's attachment to the pneumatic exhaust control piston comprises a threaded attachment pin; a portion of the pneumatic tunnel comprises within the sliding tongue a frontal sector and a middle sector of differing diameter and the threaded attachment pin comprises an axially disposed tunnel along the length thereof;

whereby the diameter of the middle tunnel sector is greater than that of the frontal tunnel sector and the threaded attachment pin tunnel.

9. The two-cycle engine exhaust port power regulator according to claim 8 wherein the diameter of the frontal tunnel sector equals 0.050 inch, that of the middle tunnel sector equals 0.200 inch and that of the threaded attachment pin equals 0.080 inch.

10. The two-cycle engine exhaust port power regulator according to claim 1 wherein the means of the sliding tongue's attachment to the pneumatic exhaust control piston comprises a threaded attachment pin comprising in turn an installation recess;

whereby manufacture of the regulator is facilitated.

* * * * *